United States Patent [19]
Uno et al.

[11] 3,829,876
[45] Aug. 13, 1974

[54] FILM COUNT INDICATING MEANS FOR CAMERAS THAT CAN PERFORM MULTIPLE OVERLAPPING EXPOSURE

[75] Inventors: Naoyuki Uno, Kawagoe; Fumio Urano, Wako, both of Japan

[73] Assignee: Asahi Kogaku Kogyo Kabushiki Kaisha, Tokyo-To, Japan

[22] Filed: May 8, 1973

[21] Appl. No.: 358,264

[30] Foreign Application Priority Data
May 16, 1972 Japan.......................... 47-57140[U]

[52] U.S. Cl.................. 354/209, 354/204, 354/217, 242/71.4
[51] Int. Cl....................... G03b 17/42, G03b 17/36
[58] Field of Search...... 95/31 AC, 31 FL; 242/71.4

[56] References Cited
UNITED STATES PATENTS
3,687,039  8/1972  Furuta............................. 95/31 AC Primary Examiner—Robert P. Greiner
Attorney, Agent, or Firm—Steinberg & Blake

[57] ABSTRACT

A camera which can be manipulated to provide intentional multiple exposures. The camera has a film-advancing structure for advancing an unexposed film frame into an exposure position in response to cocking of a shutter of the camera. Also, the camera has a frame-counting structure for counting the number of exposed frames in response to cocking of the camera shutter. A manually operable structure is accessible to the operator of the camera to be manipulated for creating conditions suitable for carrying out an intentional multiple exposure. This manually operable structure is operatively connected on the one hand with the film-advancing structure and on the other hand with the frame-counting structure to prevent actuation of both of the latter structures in response to cocking of the shutter.

9 Claims, 4 Drawing Figures

PATENTED AUG 13 1974 3,829,876
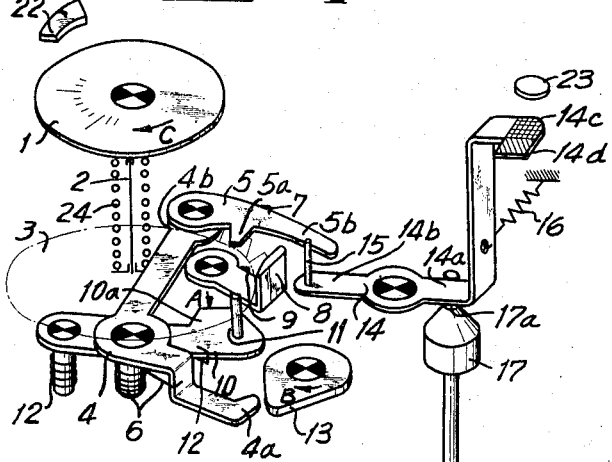
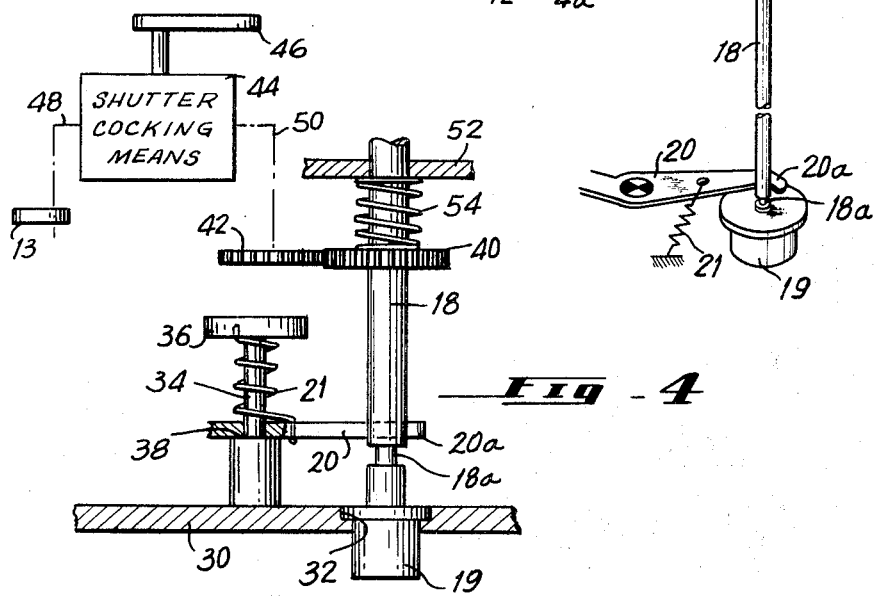
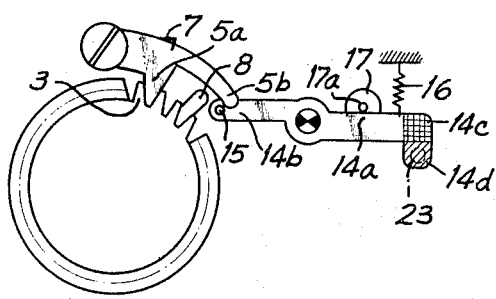
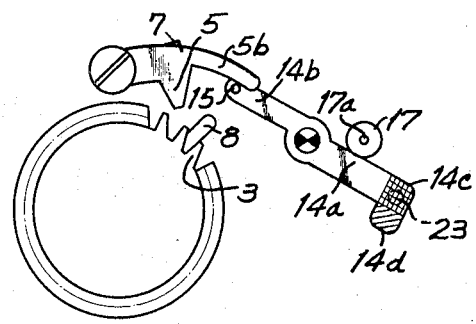

FILM COUNT INDICATING MEANS FOR CAMERAS THAT CAN PERFORM MULTIPLE OVERLAPPING EXPOSURE

BACKGROUND OF THE INVENTION

The present invention relates to cameras.

In particular, the present invention relates to that part of the camera structure which takes care of counting the exposed frames and advancing the film.

As is well known, many cameras have a construction according to which a single lever is manipulated by the operator for the purpose of cocking the shutter and advancing the film. In other words it is impossible with such cameras to cock the shutter without advancing the film. This latter type of arrangement is of course highly desirable in order to prevent accidental or unintentional multiple exposures.

However, there are situations where the operator will desire to make an intentional multiple exposure, in order to achieve special effects, for example. Thus, when a camera of the above type is to be used for making an intentional multiple exposure, it is necessary, after a frame is first exposed, to carry out an operation according to which the shutter will be cocked but the film will not be advanced. In order to achieve this latter result, it is possible to disconnect the transmission from the single lever used both for film advance and shutter cocking to the film-advancing structure, so that when this lever is operated under these conditions only the shutter will be cocked but the film will not be advanced. In order to disconnect the transmission to the film-advancing structure of the camera it is conventional to manipulate the rewinding or reversing button accessible on most cameras for the purpose of disconnecting the transmission to the film advancing structure, so that the film-rewinding structure can be manipulated to rewind the exposed film prior to removal thereof from the camera.

In addition to the above known structure, cameras conventionally include a counter structure which counts the number of frames which have been exposed, so that the operator will know how much film is left in the camera to be exposed. This counter structure for counting the number of frames which are exposed is also operated automatically in response to manipulation of the single lever which is used conventionally to advance the film and cock the shutter. As a result, with camera structures as set forth above, when the operator depresses the rewinding button and cocks the shutter in order to make a multiple exposure, the frame-counting structure will necessarily be operated to indicate that an additional frame has been exposed. However, the fact is that an additional frame has not been exposed, and instead the same frame is exposed more than once. Therefore, with such constructions the counter gives an inaccurate indication of the number of frames which have been exposed, and it can well be appreciated that if a number of frames on a given film strip have multiple exposures, the extent to which the counter indicates an improper number of exposed frames can be considerable. Thus, with cameras of the above type it is not possible for the frame-counter to indicate accurately the number of frames exposed, or the number of frames remaining to be exposed.

SUMMARY OF THE INVENTION

It is accordingly a primary object of the present invention to provide a camera with structure which will solve the above problem.

Thus, it is an object of the present invention to provide a camera with structure which will enable multiple exposures to be made while at the same time preventing the frame-counting assembly from giving an improper indication of the number of frames exposed or the number of frames remaining to be exposed.

A further object of the present invention is to provide a structure of the above type which is capable of indicating to the operator when the camera has been placed in a condition for making multiple exposures.

Also, it is an object of the present invention to provide a structure of the above type which is relatively simple and rugged and which can readily be incorporated into cameras which otherwise have conventional structure.

In addition, it is an object of the present invention to provide a structure of the above type which hardly requires a camera to be operated in any way different from conventional operation thereof in order to achieve the results of the invention.

According to the invention the camera has a film-advancing means for advancing an unexposed film frame into an exposure position in response to cocking of a shutter of the camera. Also, the camera has a frame-counting means for counting the number of exposed frames in response to cocking of the shutter of the camera. A manually operable means is accessible to the operator of the camera to be manipulated for creating conditions suitable for carrying out an intentional multiple exposure. This manually operable means is operatively connected on the one hand with the film-advancing means and on the other hand with the frame-counting means to prevent actuation of both of these means in response to cocking of the shutter.

It is to be understood that when reference is made above or in the description and claims which follow to a frame-counting means which is capable of counting the number of exposed frames, this frame-counting means, while indeed counting the number of exposed frames, nevertheless can give an indication either of the number of frames actually exposed or the number of frames remaining to be exposed.

BRIEF DESCRIPTION OF DRAWINGS

The invention is illustrated by way of example in the accompanying drawings which form part of this application and in which:

FIG. 1 is a fragmentary perspective illustration which shows in a partly schematic manner one embodiment of a structure according to the present invention;

FIG. 2 is a schematic top plan view of part of the structure of FIG. 1 illustrating the position which this structure takes during normal camera operation when a multiple exposure is not made;

FIG. 3 shows the position which the parts of FIG. 2 assume when a multiple exposure is made; and FIG. 4 is a schematic illustration of further features of the invention.

DESCRIPTION OF PREFERRED EMBODIMENTS

Referring first to FIG. 1, there is shown at the upper left portion thereof a dial or indicating disc 1 carrying on its upper surface numerals which are visible from the exterior of the camera through a window 22, as schematically illustrated in FIG. 1. These numerals are indicative either of the number of frames which have been exposed or the number of frames remaining to be exposed. The dial or disc 1 is connected to the top end of a shaft 2 which is connected at its bottom end to a rotary frame-counting wheel 3 which forms part of the frame-counting means of the camera.

A transmission means is operatively connected with the frame-counting means for turning the counting wheel 3 thereof through a given angular increment each time the shutter is cocked. This transmission means includes a bell crank lever 4 having a pair of opposed free end portions 4a and 4b. In response to cocking of the shutter, a cam 13 which is illustrated in FIG. 1 rotates once in the direction indicated by the arrow B, and at each revolution of the cam 13, this cam will engage the end 4a of the lever 4 in order to turn the latter in a clockwise direction, as viewed in FIG. 1.

The other end 4b of the lever 4 is pivotally connected with and carries a lever 5 having a tooth 5a which is adapted to mesh with the teeth at the periphery of the counting wheel 3. Thus, the element 5 forms a wheel-turning element of the transmission means which is operatively connected with the frame-counting means.

A spring 6 is operatively connected with the lever 4 so as to urge the latter in a counterclockwise direction, as viewed in FIG. 1, while a spring 7 is operatively connected with the swingable wheel-turning element 5 in order to urge this element 5 in a clockwise direction, as viewed in FIG. 1.

The structure illustrated in FIG. 1 also includes a lever 8 which is turnable about an axis parallel to the shaft 2, the lever 8 being situated beneath the wheel 3 except for the vertically extending free end of the lever 8 which also forms a tooth capable of meshing with the teeth at the periphery of the wheel 3. This lever 8 will prevent return of the wheel 3 after it has been turned through a given increment by the wheel-turning element 5.

FIG. 1 also shows the counter-releasing lever 10 which is turned in opposition to the spring 12 in the direction of the arrow A when the lid or closure wall, at the rear of the camera, for example, is placed in a closed position, so as to prevent release of the lever 10 to the force of the spring 12 for resetting the counter means at its starting position. The manner in which this counting structure operates is set forth in greater detail below. Thus, the closure element of the camera maintains the lever 10 in a position where the counter is capable of operating.

In this latter operative state of the frame-counting means, when the operator manipulates the single lever of the camera which is available for advancing film and cocking the shutter, the cam 13 will be rotated through a single revolution in the direction of the arrow B, so that the cam 13 will engage the end 4a of the lever 4, causing the lever 4 to be swung in a clockwise direction, in opposition to the spring 6. The result is that the lever 5 is also swung in a clockwise direction, and since the projection 5a of the wheel-turning element 5 meshes with the teeth at the periphery of the wheel 3, the wheel 3 is necessarily turned through a given increment in order to count another frame. Of course, the spring 7 maintains the projection 5a of element 5 in engagement with the teeth of the wheel 3. The turning of the wheel 3 under these conditions causes one tooth thereof to ride past the tooth of lever 8, swinging the latter in opposition to the force of the spring 9, and thus the tooth of the lever 8 will immediately snap into the space between the next pair of teeth at the periphery of the wheel 3, to prevent return of the counting wheel 3. On the other hand, when the cam 13 moves beyond the end 4a of the lever 4, the spring 6 returns the lever 4 to its starting position, causing the wheel-turning element 5 to have its projection 5a displaced from one space to the next space at the periphery of the wheel 3.

The above structure will operate in this normal and for the most part conventional manner when the structure has the position shown in FIG. 2. Of course, the dial turns with the wheel 3 so as to indicate through the window 22 the number of exposed frames, the dial turning in the direction of the arrow C shown in FIG. 1.

A spring 24 extends around the shaft 2 and is operatively connected with the wheel 3 so as to return the latter and the dial 1 to a starting position. When the rear door of the camera is opened, the action on the lever 10 in the direction of the arrow A in opposition to the spring 12 is removed, so that now the spring 12 will turn the lever 10 in a counterclockwise direction, as viewed in FIG. 1. The result is that a pin 11 which is fixed to and projects from the lever 10 will swing the lever 8 outwardly in opposition to the spring 9 to displace the tooth at the end of the lever 8 out of mesh with the wheel 3. At the same time, the tooth at the free end of the lever 8 will move into engagement with the wheel-turning element 5 for swinging the latter in opposition to the spring 7 to a location where its tooth 5a no longer meshes with the wheel 3. As a result the wheel 3 is released to the action of the spring 24 which returns the wheel 3 to a starting position in a well known manner, and thus the counter disc 1 is zeroed.

In accordance with the present invention, as described in greater detail below, the transmission described above for turning the wheel 3 is placed in an inoperative condition where the wheel 3 will not be turned when a multiple exposure is intentionally made by the operator.

For this latter purpose, the structure of the invention includes a lever 14 supported in any suitable way for swinging movement about a vertical axis and having a portion 14a acted upon by a spring 16, as schematically shown in FIG. 1, to urge the lever 14 in a counterclockwise direction, as viewed in FIG. 1. In this way the lever 14 is maintained at its portion 14a in engagement with a vertically extending pin 17a which is rigidly fixed with and extends upwardly from a cam 17 having a substantially conical camming surface which projects upwardly from the lower cylindrical portion of the cam 17 which is fixed to the top end of a vertically extending shaft 18. The shaft 18 forms part of a film-advancing means.

The shaft 18 forms part of a film-advancing means and is mounted in such a way that it is capable of being shifted axially. Beneath the shaft 18 is a manually operable means 19 in the form of a button projecting from the bottom of the camera and accessible to the operator so that the operator can push the button 19 upwardly either for the purpose of rewinding exposed film or for the purpose of carrying out a multiple exposure in a manner described in greater detail below. The structure includes a lever 20 urged in a clockwise direction, as viewed in FIG. 1, by a spring 21 so that the portion 20a of the lever 20 presses against the shaft 18. The shaft 18 is formed near its bottom end with a circular groove 18a capable of receiving the portion 20a of the lever 20 so that the shaft 18 will remain in an axially shifted position even after the button or manually operable means 19 is released by the operator.

Referring to FIG. 4, there is schematically shown therein the bottom wall 30 of the camera. This bottom wall is provided with a stepped recess 32 which receives the button 19 in the manner shown in FIG. 4. The lever 20 is supported for turning movement on a shaft 34 and is urged downwardly toward an upwardly directed shoulder of the shaft 34 by the spring 21. This spring 21 engages at its top end an enlargement 36 of the shaft 34, and the spring 21 is hooked around an edge of the lever 20 so as to urge the free end 20a thereof against the shaft 18 as well as to urge the lever 20 downwardly into engagement with the upwardly directed shoulder 38 of the shaft 34 which is fixed to the bottom wall 30 in any suitable way.

As is schematically shown in FIG. 4, the shaft 18 carries a sprocket or gear 40 which normally meshes with a sprocket or gear 42 of a second transmission means. Thus, as is schematically shown in FIG. 4, the camera has a shutter cocking means 44 of a well known construction capable of being actuated by turning of the lever 46 which is accessible to the operator at the exterior of the camera. In response to operation of the shutter-cocking means 44, there is an actuation of one transmission 48, schematically shown in dot-dash lines, for turning the cam 13 through one revolution, as pointed out above, while the operation of the shutter-cocking means 44 also results in operation of a second transmission 50 which serves to rotate the drive wheel 42 which normally meshes with the sprocket or gear 40. The shaft 18 is supported for rotary movement in a bearing structure 52 and is urged downwardly toward the button 19 by a spring 54.

With the structure described above when the operator pushes the manually operable means 19 upwardly from the outside of the camera, the transmission element 40 of the shaft 18 is disengaged from the transmission element 42, and at this time the spring 21 advances the end 20a of the lever 20 into the groove 18a, so that even if the operator releases the button 19, the shaft 18 remains in its position disengaged from the transmission 50, 42, and thus the rewinding operations can proceed in a well known manner. When the camera is again ready to be operated in a normal manner with a new supply of unexposed film, the lever 20 is turned in a known way out of the groove 18 and the shaft 18 is returned by the spring 54 to the position where the transmission 50, 42 is connected with the element 40 carried by the shaft 18.

In accordance with the present invention, however, when it is desired to make multiple exposures, the operator pushes the button 19 upwardly beyond the location to which it is pushed in order to carry out the rewinding operations. Thus, the shaft 18 will now move upwardly while the lever 20 slides upwardly along the shaft 34, and the inclined or conical surface area of the cam 17 will now engage the lever 14 so as to swing the latter in a clockwise direction, in opposition to the spring 16. At this time a pin 15 which is fixed to and extends upwardly from the free end 14b of the lever 14 engages the free end 5b of the wheel-turning element 5 and swings the latter in opposition to the spring 7 to a location where the tooth 5a no longer meshes with the teeth of the wheel 3. This is the position of the parts which is shown in FIG. 3. Thus, the operator need only push the button 19 upwardly beyond the extent to which it is pushed for rewinding purposes, and the transmission to the wheel 3 is placed in a condition where the wheel 3 cannot be turned. With the button 19 held in its upper position for multiple exposure operation, the operator will manipulate the lever 46 to cock the shutter, and it will be seen that there will be no turning of the wheel 3 or of the shaft 18.

An indicating means is provided to indicate to the operator whether or not the camera is in a condition for making multiple exposures. For this purpose the free end 14a of the lever 14 carries an extension which at its top end is provided with an indicating portion having differently colored areas 14c and 14d. Normally the portion 14d is situated beneath the window 23, as shown schematically in FIG. 2, and this portion 14d has a color which indicates to the operator that the camera is set for normal operation. However, when the shaft 18 has been moved upwardly through a distance sufficient to swing the lever 14 to locate the wheel-turning element 5 in the position of FIG. 3, the indicating portion 14c of the indicating means will be positioned beneath the window 23, and the operator will now see a different color which is indicative of the fact that the camera has been placed in a condition suitable for making a multiple exposure.

It is to be noted that when the operator moves the button 19 upwardly through a distance sufficient to cause the pin 15 to swing the element 5 to the position of FIG. 3, the tooth of the lever 8 remains in engagement with the wheel 3 so that the latter cannot be returned by the spring 24 to the starting position. Thus, the indication of the number of frames which have been exposed remains unchanged. Under these conditions, of course, manipulation of the shutter-cocking means will only cause the curved free end portion 5b of the element 5 to move back and forth along the pin 15 which is maintained in the position shown in FIG. 3 at this time.

Thus, with the above-described structure of the invention when a multiple exposure is to be made the frame-counting means cannot be operated and at the same time an indication is given to the operator that the camera is in condition for making multiple exposures. Of course, when the operator releases the manually operable means 19, the spring 54 will return the shaft 18 to its lower position and setting of the camera for normal film-winding operation will displace the lever 20 out of the groove 18a, so that the shaft 18 will be again connected to the transmission for advancing the film. Thus, with the present invention the button 19 which in any event is present to axially move the shaft 18 to a film-advancing position is moved only through a somewhat greater distance in order to bring about the various functions and operations described above which enable multiple exposures to be made.

What is claimed is:

1. In a camera, film-advancing means for advancing an unexposed film frame into an exposure position in response to cocking of a shutter of the camera, frame-counting means for counting the number of exposed frames in response to cocking of the shutter of the camera, manually operable means accessible to the operator of the camera for carrying out an intentional multiple exposure, said manual operable means being operatively connected on the one hand with said film-advancing means and on the other hand with said frame-counting means for preventing actuation of both of the latter means in response to cocking of the shutter, and indicating means operatively connected with said manually operable means to be actuated thereby for indicating to the camera operator when a multiple exposure is made.

2. In a camera, film-advancing means for advancing an unexposed film frame into an exposure position in response to cocking of a shutter of the camera, frame-counting means for counting the number of exposed frames in response to cocking of the shutter of the camera, manually operable means accessible to the operator of the camera for carrying out an intentional multiple exposure, said manual operable means being operatively connected on the one hand with said film-advancing means and on the other hand with said frame-counting means for preventing actuation of both of the latter means in response to cocking of the shutter, shuter-cocking means for cocking a shutter of the camera and a pair of transmission means one extending from said shutter-cocking means to said film-advancing means for actuating the latter in response to cocking of the shutter and the other extending from said shutter-cocking means to said frame-counting means for actuating the latter in response to cocking of the shutter, said manually operable means coacting with both of said transmission means for rendering them inoperative when a multiple exposure is to be made.

3. The combination of claim 2 and wherein said film advancing means includes a rotary film-advancing shaft and said frame-counting means includes a rotary frame-counting wheel, said one transmission means being operatively connected with said shaft only when the latter is in a given axial position and said other transmission means including a wheel turning element which turns said wheel through a given increment in response to cocking of the shutter, said manually operable means displacing said shaft axially away from said given position thereof to disconnect said shaft from said one transmission and displacing said wheel-turning element out of operative engagement with said frame-counting wheel when said manually operable means is placed by the operator in a position for making a multiple exposure.

4. The combination of claim 3 and wherein said shaft is displaced by said manually operable means through a given axial distance from said given position when making a multiple exposure, and said manually operable means being operatively connected with said shaft for displacing the latter from said given position thereof through a fraction of said given distance to place said shaft in a rewinding position where exposed film can be rewound.

5. The combination of claim 4 and wherein said wheel-turning element is swingable into and out of engagement with said frame-counting wheel, a lever engaging said element for swinging the latter away from said wheel, and a cam carried by said shaft and actuating said lever to swing said element away from said wheel when said shaft is displaced by said manually operable means through said given axial distance to carry out a multiple exposure.

6. The combination of claim 5 and wherein said manually operable means is a button accessible to the operator and situated at the region of one end of said shaft for axially displacing the latter when said button is depressed by the operator.

7. The combination of claim 5 and wherein said lever has an indicating portion which is visible to the camera operator, and said indicating portion carrying indicia indicative of multiple exposure operation and rendered visible to the operator when said manually operable means acts through said shaft and cam on said lever to swing said element away from said wheel.

8. The combination of claim 7 and wherein said indicating portion of said lever also carries indicia for indicating when said manually operable means is not actuated to carry out a multiple exposure.

9. The combination of claim 5 and wherein said wheel has teeth at its periphery and said turning element is a tooth swingable into and out of mesh with said teeth, a spring being operatively connected with said element for urging said tooth into mesh with said teeth, and said lever swinging said tooth out of mesh with said teeth in opposition to said spring when said lever is displaced by said cam in response to axial displacement of said shaft by said manually operable means to carry out a multiple exposure.

* * * * *